United States Patent
Park

(10) Patent No.: US 12,386,946 B2
(45) Date of Patent: Aug. 12, 2025

(54) AUTHENTICATION DEVICE AND CONTROL METHOD THEREOF

(71) Applicant: MUZLIVE INC., Seoul (KR)

(72) Inventor: Jong Sung Park, Seoul (KR)

(73) Assignee: MUZLIVE INC., Seoul (KR)

( * ) Notice: Subject to any disclaimer, the term of this patent is extended or adjusted under 35 U.S.C. 154(b) by 235 days.

(21) Appl. No.: 18/023,520

(22) PCT Filed: Nov. 23, 2020

(86) PCT No.: PCT/KR2020/016565
§ 371 (c)(1),
(2) Date: Feb. 27, 2023

(87) PCT Pub. No.: WO2022/050497
PCT Pub. Date: Mar. 10, 2022

(65) Prior Publication Data
US 2023/0259610 A1      Aug. 17, 2023

(30) Foreign Application Priority Data
Sep. 3, 2020   (KR) .................. 10-2020-0112423

(51) Int. Cl.
*G06F 21/45* (2013.01)
*G06F 21/60* (2013.01)

(52) U.S. Cl.
CPC ............ *G06F 21/45* (2013.01); *G06F 21/602* (2013.01)

(58) Field of Classification Search
None
See application file for complete search history.

(56) References Cited

U.S. PATENT DOCUMENTS

2004/0133789 A1*   7/2004   Gantman ........... G06Q 20/4014
                                                              713/189

FOREIGN PATENT DOCUMENTS

| KR | 10-1997-0055903 A | 7/1997 |
| KR | 20-0291064 Y1 | 10/2002 |
| KR | 10-2006-0056334 A | 5/2006 |

(Continued)

OTHER PUBLICATIONS

International Search Report from corresponding PCT Application No. PCT/KR2020/016565, dated Sep. 24, 2021.

(Continued)

*Primary Examiner* — Cai Y Chen
(74) *Attorney, Agent, or Firm* — Harness, Dickey & Pierce, P.L.C.

(57) ABSTRACT

Disclosed is an authentication device. The authentication device comprises: a storage unit for storing authentication information and a plurality of counting information corresponding to a conversion method for converting the authentication information into a sound wave signal; a control unit for converting the authentication information into a sound wave signal by a conversion method corresponding to the counting information changed according to the number of user input; and a sound wave output unit for outputting the authentication information converted into the sound wave signal and the changed counting information as a sound wave signal. Accordingly, it is possible to achieve the effect of improving security as the sound wave signal for transmitting the same authentication information is changed according to the counting information.

10 Claims, 7 Drawing Sheets

(56) References Cited

FOREIGN PATENT DOCUMENTS

| KR | 10-2007-0029987 A | 3/2007 |
| KR | 10-2020-0047214 A | 5/2020 |

OTHER PUBLICATIONS

Lim, Y-G., et al.; "User Identification Method based on Sonic Communication" Proceedings of ACK (Annual Conference of KIPS), 2016, vol. 23, No. 2, pp. 501-502.

* cited by examiner

FIG. 4b

| Counting information | Authentication Information | | |
|---|---|---|---|
| | A | B | C |
| 000 | 16000Hz | 16160Hz | 16320Hz |
| 001 | 32000Hz | 32160Hz | 32320Hz |
| 010 | 48000Hz | 48160Hz | 48320Hz |
| 011 | 64000Hz | 64160Hz | 64320Hz |
| ⋮ | ⋮ | ⋮ | ⋮ |

FIG. 4c

| Counting information | Authentication Information |
|---|---|
| | ABC |
| 000 | XOR |
| 001 | OR |
| 010 | AND |
| 011 | NOR |
| ⋮ | ⋮ |

| Counting information | Authentication Information ABC | | |
|---|---|---|---|
| 000 | A | B | C |
|  | 16000Hz | NOR | 16320Hz |
| 001 | C | A | B |
|  | 32000Hz | XOR | 32320Hz |
| 010 | B | C | A |
|  | OR | 32160Hz | XOR |
| 011 | B | A | C |
|  | AND | 64160Hz | 64320Hz |
| ⋮ | ⋮ | ⋮ | ⋮ |

AUTHENTICATION DEVICE AND CONTROL METHOD THEREOF

CROSS-REFERENCE TO RELATED APPLICATIONS

This application is a national phase application of PCT Application No. PCT/KR2020/016565, filed on Nov. 23, 2020, which claims benefit of Korean Patent Application No. 10-2020-0112423, filed on Sep. 3, 2020. The entire disclosure of the applications identified in this paragraph are incorporated herein by references.

TECHNICAL FIELD

The present invention relates to an authentication device and a control method thereof, and more particularly, to an authentication device using inaudible sound wave communication in which authentication information is converted depending on counting information to improve security.

BACKGROUND ART

A cultural technology narrowly refers to a technology required for planning, development, production, and the like of various types of cultural content such as movies, games, and animations, but in a broad sense, refers to an overall technology for improving the quality of cultural life on the basis of science and technology.

With the development of such a cultural technology, a new type of content transfer medium that breaks away from an existing scheme has begun to appear. For example, in an album market, USB-type albums or albums that can be connected to an AUX terminal of a smartphone have begun to appear to replace traditional CD-type albums.

Such new types of albums are distributed in the form of sales of a storage medium having authentication information stored therein. When a user who purchases the storage medium having authentication information stored therein connects the storage medium to a terminal device such as a smartphone or tablet PC and then executes a corresponding application, music content corresponding to the authentication information is downloaded from a server to the terminal device.

However, since recent smart phones, tablet PCs, or the like are released without a traditional interface such as an AUX terminal, a problem has arisen in that the interface as described above cannot be utilized to transmit the authentication information stored in the storage medium to a user terminal device.

A method of transmitting the authentication information to the user terminal device through a wireless communication network interface such as Wi-Fi or Bluetooth may be considered, but in this case, there are problems that the storage medium having the authentication information stored therein should include a wireless communication network module as described above, and it takes a predetermined time to construct a pairing between the user terminal device and the storage medium, making users uncomfortable.

Accordingly, a scheme of downloading content by transmitting the authentication information to the outside using inaudible sound wave communication has been devised.

A method using the inaudible sound wave communication has advantages that a separate communication module is not required and a pairing process for data transmission and reception between devices is not required, but has a problem with security vulnerability because authentication information converted into sound waves may leak due to unauthorized recording or the like.

Accordingly, a need has emerged for a new type of authentication information transmission device using inaudible sound wave communication capable of improving security while enjoying advantages of the inaudible sound wave communication, and a method thereof.

SUMMARY

An object of the present invention is to provide an authentication device using inaudible sound wave communication capable of preventing authentication information from leaking and being used in inaudible sound wave communication.

To achieve this object, an authentication device according to an embodiment of the present invention includes a storage unit configured to store authentication information and a plurality of pieces of counting information corresponding to conversion methods of converting the authentication information into a sound wave signal; a control unit configured to convert the authentication information into the sound wave signal by using the conversion method corresponding to the counting information changed according to the number of user inputs; and a sound wave output unit configured to output the authentication information converted into the sound wave signal and the changed counting information as a sound wave signal.

Here, the storage unit stores, for each of a plurality of pieces of counting information, a mapping table regarding at least one of an order of arrangement of data constituting the authentication information, frequency information of a sound wave signal corresponding to the data constituting the authentication information, and operator information for encrypting the data constituting the authentication information.

The control unit may arrange data of the authentication information in a first data arrangement order corresponding to first counting information to perform conversion into a sound wave signal when the first counting information is selected from among the plurality of pieces of counting information stored in the storage unit according to the number of user inputs, and arrange the data of the authentication information in a second data arrangement order corresponding to second counting information to perform conversion into a sound wave signal when the second counting information is selected from among the plurality of pieces of counting information stored in the storage unit according to the number of user inputs.

Further, the control unit may convert the authentication information into a sound wave signal on the basis of on first frequency information corresponding to first counting information when the first counting information is selected from among the plurality of pieces of counting information stored in the storage unit according to the number of user inputs, and convert the authentication information into a sound wave signal on the basis of on second frequency information corresponding to second counting information when the second counting information is selected from among the plurality of pieces of counting information stored in the storage unit according to the number of user inputs.

Further, the control unit may encrypt the authentication information to perform conversion into a sound wave signal on the basis of first operator information corresponding to first counting information when the first counting information is selected from among the plurality of pieces of counting information stored in the storage unit according to the number of user inputs, encrypt the authentication information to perform conversion into a sound wave signal on the basis of second operator information corresponding to second counting information when the second counting information is selected from among the plurality of pieces of counting information stored in the storage unit according to the number of user inputs.

Further, the control unit may reconstruct the authentication information to perform conversion into a sound wave signal on the basis of at least one of first data arrangement order, first frequency information, and first operator information corresponding to first counting information when the first counting information is selected from among the plurality of pieces of counting information stored in the storage unit according to the number of user inputs.

Further, the control unit may reconstruct the authentication information to perform conversion into a sound wave signal on the basis of at least one of second data arrangement order, second frequency information, and second operator information corresponding to second counting information when the second counting information is selected from among the plurality of pieces of counting information stored in the storage unit according to the number of user inputs.

Further, the control unit may generate different sound wave signals on the basis of at least one of the first data arrangement order, the first frequency information, and the first operator information corresponding to the first counting information, for the same authentication information.

Further, the storage unit stores at least one of a data arrangement order, frequency information, and operator information used for generation of the sound wave signal.

Meanwhile, a control method of an authentication device for storing a plurality of pieces of counting information corresponding to conversion methods of converting authentication information into a sound wave signal according to an embodiment of the present invention includes converting the authentication information into a sound wave signal by using the conversion method corresponding to the counting information changed according to the number of user inputs; and outputting the authentication information converted into the sound wave signal and the changed counting information as a sound wave signal.

Advantageous Effects

According to the authentication device described above, since the sound wave signal for transmitting the same authentication information is changed depending on the counting information, it is possible to achieve an effect of improved security.

Further, it is possible to achieve an effect of preventing authentication information transmitted through an inaudible frequency from being stolen and used due to unauthorized recording or the like.

Effects of the present invention are not limited to the effects mentioned above, and other effects not mentioned will be clearly understood by those skilled in the art from the description of the claims.

BRIEF DESCRIPTION OF THE DRAWINGS

FIG. 3 is a diagram illustrating a sound wave signal output from an authentication device according to an embodiment of the present invention.

FIGS. 4a, 4b and 4c are diagrams illustrating a conversion relationship between counting information and a character or number according to an embodiment of the present invention.

DESCRIPTION OF EXEMPLARY EMBODIMENTS

Hereinafter, embodiments of the present invention will be described in detail with reference to the accompanying drawings. When a determination is made that detailed description of related known functions or configurations may unnecessarily obscure the gist of the present invention in describing the present invention, the detailed description will be omitted. Further, terms to be described later are terms defined in consideration of functions in the present invention, which may vary depending on the intention or relationship of a user or operator. Therefore, definitions thereof should be made on the basis of content throughout the present specification.

When the embodiments of the present invention are described, the same names and the same reference signs are used for components having the same functions, but it is to be noted in advance that the components are not substantially the same as those of the prior art.

Further, terms used herein are only used to describe specific embodiments, and are not intended to limit the present invention. Singular expressions include plural expressions unless the context clearly dictates otherwise. It should be understood that the terms "include" or "have" used therein are intended to designate that there is a feature, number, step, operation, component, part, or combination thereof described herein, and does not preclude the presence or addition of one or more other features numbers, steps, operations, components, parts, or combinations thereof.

Figure 1:
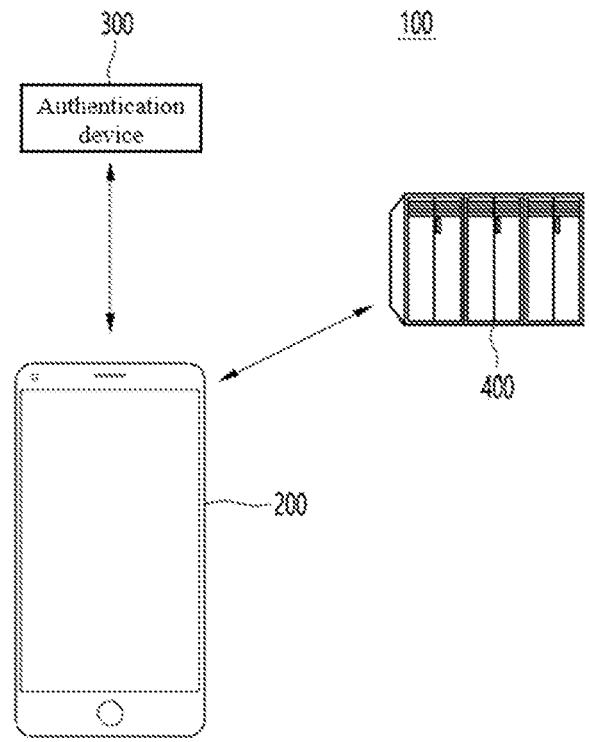
FIG. 1 is a system diagram illustrating an authentication system according to an embodiment of the present invention.

FIG. 1 is a system diagram illustrating an authentication system according to an embodiment of the present inven- The authentication system 100 according to an embodiment of the present invention includes a user terminal device 200, an authentication device 300, and a management server 400.

The user terminal device 200 is an electronic device such as a smart phone or a tablet PC, and may have a dedicated application capable of reproducing content received from the management server 400 installed thereon. Further, the dedicated application may receive the authentication information transmitted from the authentication device 300 and transmit the authentication information to the management server 400 so that an authentication procedure is performed.

The authentication device 300 stores authentication information required for downloading of content from the management server. Further, the authentication device 300 may include a sound wave output unit (not illustrated) that converts the authentication information into a predetermined sound wave signal and outputs the sound wave signal. The sound wave output unit according to an embodiment of the present invention may be implemented as a speaker.

The management server 400 stores a plurality of content files corresponding to the authentication information.

Although an example in which the management server 400 is one physical server has been illustrated in the present embodiment, this is for convenience of description and it is obvious that the management server 400 may be physically or logically divided into a server that performs authentication, a server that stores content files, and the like.

When the management server 400 is physically or logically divided into the authentication server and the content storage server, the management server 400 transmits, to the user terminal device 200, an acquisition path along which content corresponding to the authentication information received from the user terminal device 200 can be downloaded.

The user terminal device 200, which has received the acquisition path, may access the content storage server along the acquisition path and download the content corresponding to the authentication information.

Hereinafter, a process in which the authentication device 300 transmits the authentication information to the user terminal device 200 in a non-contact manner will be described in detail.

Figure 2:
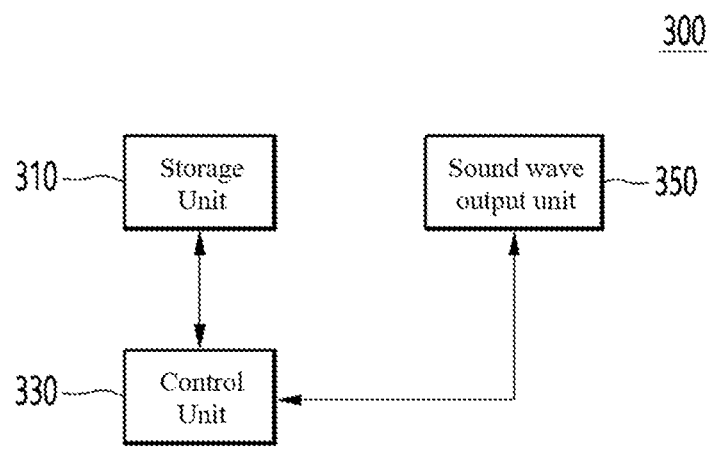
FIG. 2 is a block diagram illustrating an authentication device using inaudible sound wave communication according to an embodiment of the present invention.

FIG. 2 is a functional block diagram illustrating the authentication information transmission device using inaudible sound wave communication according to an embodiment of the present invention.

The authentication device 300 according to an embodiment of the present invention includes a storage unit 310, a control unit 330, and a sound wave output unit 350. Since only components related to the present invention are illustrated in FIG. 2, it is obvious that other components may be further included, in addition to components related to embodiments to be described below.

The storage unit 310 stores the authentication information and counting information corresponding to a conversion method for converting the authentication information into sound waves. The authentication information is information for downloading content from the management server 400 or acquiring a path along which the content can be downloaded. To this end, information corresponding to the content corresponding to the authentication information may be stored in the management server 400.

The authentication information may be at least one number, character, or combination thereof.

Meanwhile, the counting information refers to information that increases in response to the number of user inputs when a user input for causing the authentication device 300 to be executed or perform an operation according to an embodiment of the present invention is input.

For example, when a user input for the user first executing the authentication device 300 is input, the counting information is set to "01", and when a user input for the user second executing the authentication device 300 is input, the counting information may be set to "10".

In the above example, 2-bit counting information has been described as an example, but it is obvious that the counting information may be 3 bits or more.

Further, terms such as increment information or identification information may be used instead of the term counting information.

Further, for such counting information, information on a method of converting the authentication information into the sound wave signal may be stored in the form of a lookup table or a mapping table.

The information on the conversion method may be set for each piece of data constituting authentication information for each of a plurality of pieces of counting information.

Meanwhile, the storage unit 310 may store a preamble signal for notifying the user terminal device 200 that authentication information converted into a sound wave signal will be transmitted.

The control unit 330 may convert the authentication information into a sound wave signal by using a conversion method corresponding to the counting information changed according to the number of user inputs.

Specifically, the control unit 330 converts the authentication information into the sound wave signal by using a first method corresponding to the first counting information, and converts the authentication information into the sound wave signal by using a second method corresponding to the second counting information.

Here, the conversion method corresponding to the counting information may include a method of converting an arrangement order of the data constituting the authentication information, a method of converting frequency information corresponding to the data constituting the authentication information, and a method of converting an operator. This will be described later with reference to FIGS. 4a to 4c.

That is, since the counting information is changed each time a user input is input, and authentication information is converted into a sound wave signal in a method corresponding to the changed counting information, one piece of authentication information is converted into a different type of sound wave signal. Therefore, even when the sound wave signal leaks to the outside, it is possible to improve the security of the original authentication information.

The sound wave output unit 350 outputs the authentication information converted into a sound wave signal and the changed counting information as a sound wave signal. To this end, the sound wave output unit 350 according to an embodiment of the present invention may be implemented as a speaker.

The user terminal device 200 receiving the sound wave signal output from the sound wave output unit 350 may receive the authentication information included in the sound wave signal and then transmit the authentication information to the management server 400 so that an authentication procedure is performed.

Hereinafter, the counting information, the authentication information converted into a sound wave signal, and an authentication information transmission method using the same will be described in detail.

Figures 3, 4A:
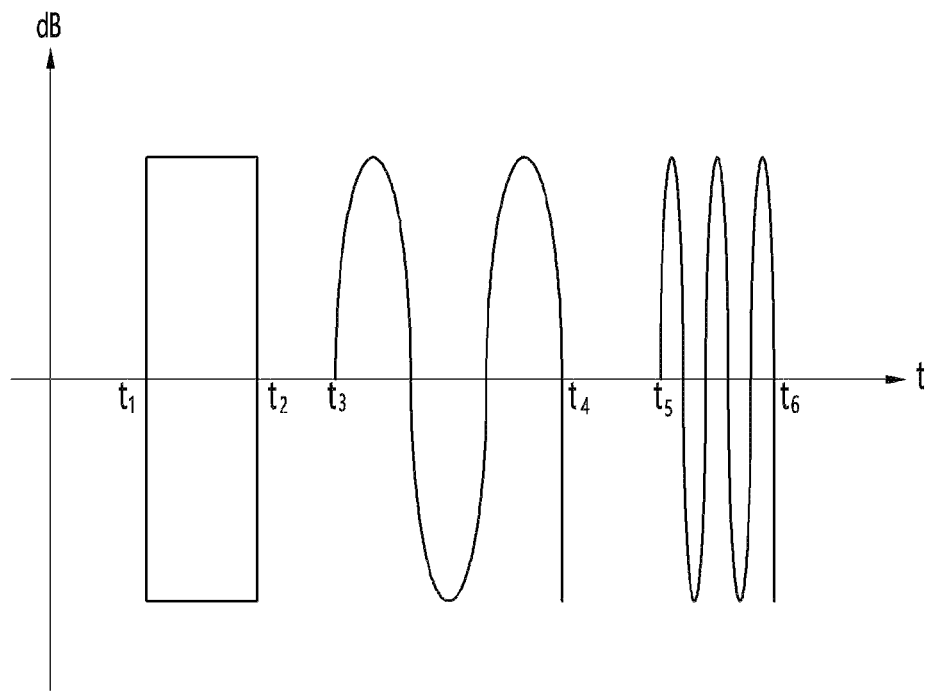

FIG. 3 is a diagram illustrating a sound wave signal output from an authentication device according to an embodiment of the present invention.

The control unit 330 according to an embodiment of the present invention outputs the preamble signal prior to outputting the authentication information converted into the sound wave signal. As described above, the preamble signal is a signal for easily identifying a point in time for accurate data analysis before the user terminal device 200 receives and analyzes the sound wave signal.

The preamble signal is output from t1 to t2, as illustrated in FIG. 3. When the output of the preamble signal ends, a sound wave signal having a frequency corresponding to a character or a number included in the authentication information is output.

For example, when the authentication information is "ABC", a sound wave signal having a frequency corresponding to the number "A" is output for a predetermined time, and then a sound wave signal having a frequency corresponding to "B" and a sound wave signal having a frequency corresponding to "C" are sequentially output for a predetermined time.

A sound wave signal having the frequency corresponding to the number or the character included in the authentication information may be output for a predetermined period of time or output repeatedly at a predetermined period.

Further, although a case in which the sound wave signals corresponding to the preamble signal and the recognition information are output in the same size has been illustrated by way of example in FIG. 3, the present invention may be implemented so that the sound wave signals are output in different sizes.

Further, although not illustrated in FIG. 3, the control unit 330 outputs a signal including the counting information after the authentication information converted into a sound wave signal is output.

FIGS. 4a to 4c are diagrams illustrating a conversion relationship between counting information and a character or number according to an embodiment of the present invention.

A mapping table regarding a method for converting a character or number into a sound wave signal for each piece of counting information may be stored in the storage unit 310 according to an embodiment of the present invention.

Specifically, the storage unit 310 stores, for each of a plurality of pieces of counting information, a mapping table regarding at least one of an order of arrangement of data (characters or numbers) constituting the authentication information, frequency information of a sound wave signal corresponding to the data constituting the authentication information, and operator information for encrypting the data constituting the authentication information.

Referring to FIG. 4a, an arrangement order of data constituting the authentication information is changed as in an example in which, when the authentication information is data consisting of "ABC", the authentication information is "ABC" when the counting information is 000, and "CAB" when the counting information is 001.

Further, when the counting information is 010, the arrangement order of the data of the authentication information is changed to "BCA", and when the counting information is 011, the arrangement order of the data of the authentication information is changed to "BAC".

As described above, since the conversion method according to the mapping table illustrated in FIG. 4a includes a conversion method for changing the arrangement order of the data constituting authentication information depending on the counting information, the arrangement order of the data constituting the authentication information is changed depending on the counting information even for the same authentication information and the authentication information is transmitted as a sound wave signal, and thus, different sound wave signals are generated and security can be improved.

Further, since the server 400 stores the same mapping table illustrated in FIG. 4c, it is possible to confirm the original authentication information by utilizing the pre-stored mapping table even when differently converted sound wave signals are received for the same authentication information as described above.

Meanwhile, although only the character A, B, and C are shown as the data constituting authentication information in FIG. 4a, it is obvious that more character strings may be included, and numbers, special characters, and the like may be further included, in addition to the characters.

Referring to FIG. 4b, it can be seen that, when the authentication information is data consisting of "ABC" and the counting information is 000, the frequency of the sound wave signal corresponding to the data A constituting the authentication information is set to 16000 Hz, the frequency of the sound wave signal corresponding to the data B constituting the authentication information is set to 16160 Hz, and the frequency of the sound wave signal corresponding to the data C constituting the authentication information is set to 16320 Hz Further, when the counting information is changed to 001, a frequency of the sound wave signal corresponding to the data A constituting the authentication information is changed and set to 32000 Hz, a frequency of the sound wave signal corresponding to the data B constituting the authentication information is changed and set to 32160 Hz, and a frequency of the sound wave signal corresponding to the data C constituting the authentication information is changed and set to 32320 Hz.

As described above, since the conversion method according to the mapping table illustrated in FIG. 4b includes a conversion method for changing the frequency of the sound wave signal corresponding to the data constituting the authentication information depending on the counting information, the frequency of the sound wave signal corresponding to the data constituting the authentication information is changed depending on the counting information even for the same authentication information, and thus, sound wave signals are generated and security can be improved.

Further, since the server 400 stores the same mapping table illustrated in FIG. 4b, it is possible to confirm the original authentication information by utilizing the pre-stored mapping table even when differently converted sound wave signals are received for the same authentication information as described above.

Meanwhile, although only the character A, B, and C are shown as the data constituting authentication information in FIG. 4b, it is obvious that more character strings may be included, and numbers, special characters, and the like may be further included, in addition to the character.

Referring to FIG. 4c, in a case in which the authentication information is data consisting of "ABC", an XOR operation is performed between the counting information or pre-stored data and the authentication information when the counting information is 000, an OR operation is performed between the counting information or the pre-stored data and the authentication information when the counting information is 001, and an AND operation is performed between the counting information or the pre-stored data and the authentication information when the counting information is 010.

As described above, since the conversion method according to the mapping table illustrated in FIG. 4c includes the operator information for encrypting the data constituting authentication information depending on the counting information, a bit operation using different operators is performed on the data constituting the authentication information depending on the counting information even for the same authentication information and the authentication information is transmitted as a sound wave signal, and thus, different sound wave signals are generated and security can be improved.

Further, since the server 400 stores the same mapping table illustrated in FIG. 4c, it is possible to confirm the original authentication information by utilizing the pre-stored mapping table even when differently converted sound wave signals are received for the same authentication information as described above.

Meanwhile, although only the character A, B, and C are shown as the data constituting authentication information in FIG. 4c, it is obvious that more character strings may be included, and numbers, special characters, and the like may be further included, in addition to the characters.

Meanwhile, the control unit 330 arranges the data of the authentication information in the first data arrangement order corresponding to the first counting information and performs conversion into a sound wave signal when the first counting information is selected from among the plurality of pieces of counting information stored in the storage unit 310 according to the number of user inputs, and arranges the data of the authentication information in the second arrangement order of the data corresponding to the second counting information and performs conversion into a sound wave signal when the second counting information is selected from among the plurality of pieces of counting information stored in the storage unit 310 according to the number of user inputs.

Figure 5A:
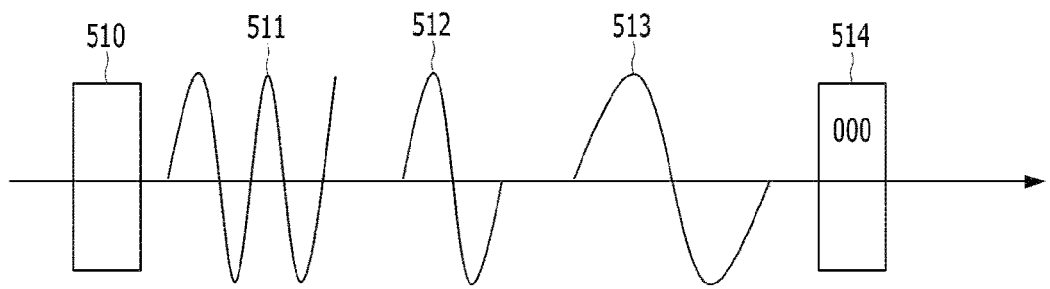
FIGS. 5a and 5b are diagrams illustrating authentication information converted into different types of sound wave signals depending on the counting information according to an embodiment of the present invention.
Figure 5B:
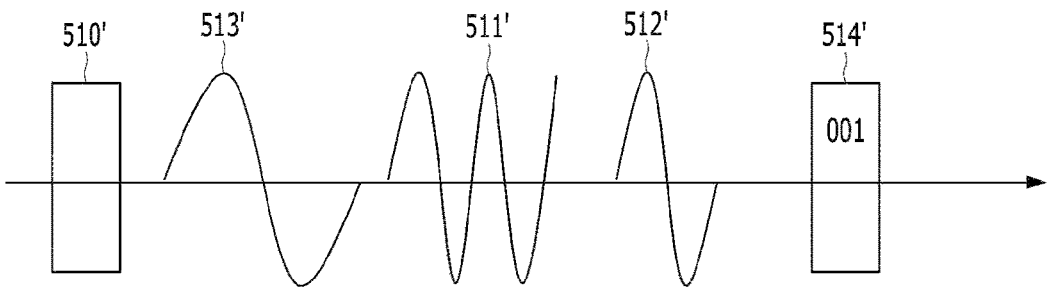

FIGS. 5a and 5b are diagrams illustrating authentication information converted into different types of sound wave signals depending on the counting information according to an embodiment of the present invention. Here, conversion performed by utilizing the mapping table illustrated in FIG. 4a as a conversion method will be described.

Referring to FIG. 5a, when the authentication information is "ABC" and the number of user inputs is 1, the control unit 330 arranges the data of the authentication information in an order of "ABC" corresponding to "000" to generate a sound wave signal when "000" is selected from among the plurality of pieces of counting information stored in the storage unit 310 in response to the number of user inputs being 1 and, for the generated sound wave signal, a preamble signal 510, a sound wave signal 511 corresponding to A, a sound wave signal 512 corresponding to B, a sound wave signal 513 corresponding to C, and counting information 514' set to "000" are generated at predetermined time intervals.

Further, referring to FIG. 5b, when the user operates the authentication device 300 again and the number of user inputs becomes 2, the control unit 330 arranges data of the authentication information in an order of "CAB" corresponding to "001" to generate a sound wave signal when "001" among the plurality of pieces of counting information stored in the storage unit 310 is selected in response to the number of user inputs being 2, and for the generated sound wave signal, a preamble signal 510', a sound wave signal 513' corresponding to C, a sound wave signal 511' corresponding to A, a sound wave signal 512' corresponding to B, and counting information 514' set to "001" are generated at predetermined time intervals.

Meanwhile, the control unit 330 converts the authentication information to the sound wave signal on the basis of first frequency information corresponding to the first counting information when the first counting information is selected from among the plurality of pieces of counting information stored in the storage unit 310 according to the number of user inputs, and converts the authentication information to the sound wave signal on the basis of second frequency information corresponding to the second counting information when the second counting information is selected from among the plurality of pieces of counting information stored in the storage unit according to the number of user inputs.

Figure 6A:
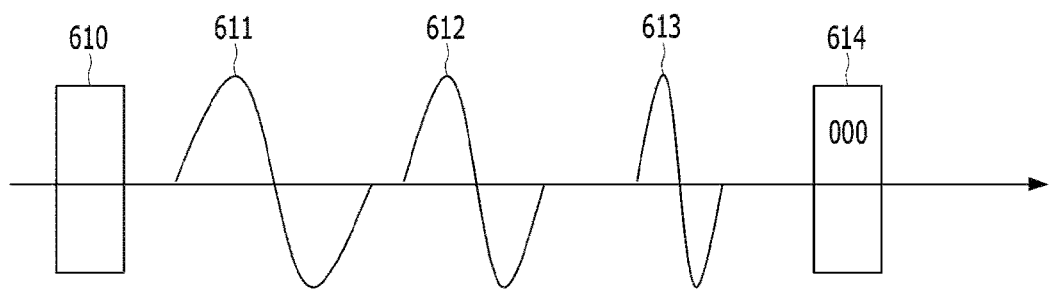
FIGS. 6a and 6b are diagrams illustrating authentication information converted into different types of sound wave signals depending on the counting information according to another embodiment of the present invention.
Figure 6B:
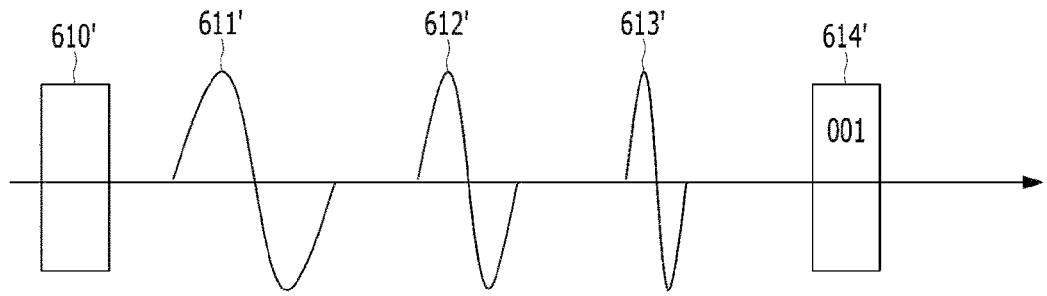

FIGS. 6a and 6b are diagrams illustrating authentication information converted into different types of sound wave signals depending on the counting information according to another embodiment of the present invention. Here, conversion performed by utilizing the mapping table illustrated in FIG. 4b as a conversion method will be described.

Referring to FIG. 6a, when the authentication information is "ABC" and the number of user inputs is 1, the control unit 330 converts the authentication information into a sound wave signal in which a frequency component of A corresponding to "000" is set to 16000 Hz, a frequency component of B is set to 16160 Hz, and a frequency component of C is set to 16320 Hz to generate the sound wave signal when "000" is selected from among the plurality of pieces of counting information stored in the storage unit 310 in response to the number of user inputs being 1, and for the generated sound wave signal, a preamble signal 610, a sound wave signal 611 corresponding to A, a sound wave signal 612 corresponding to B, a sound wave signal 613 corresponding to C, and counting information 614 set to "000" are generated at predetermined time intervals.

Further, referring to FIG. 6b, when the user operates the authentication device 300 again and the number of user inputs becomes 2, the control unit 330 converts the authentication information into a sound wave signal in which a frequency component of A corresponding to "001" is set to 32000 Hz, a frequency component of B is set to 32160 Hz, and a frequency component of C is set to 32320 Hz to generate the sound wave signal when "001" is selected from among the plurality of pieces of counting information stored in the storage unit 310 in response to the number of user inputs being 2, and for the generated sound wave signal, a preamble signal 610', a sound wave signal 611' corresponding to A, a sound wave signal 612' corresponding to B, a sound wave signal 613' corresponding to C, and counting information 614' set to "000" are generated at predetermined time intervals.

Meanwhile, the control unit 330 encrypts the authentication information on the basis of the first operator information corresponding to the first counting information and performs conversion into a sound wave signal when the first counting information is selected from among the plurality of pieces of counting information stored in the storage unit 310 according to the number of user inputs, and encrypts the authentication information on the basis of the second operator information corresponding to the second counting information and performs conversion into a sound wave signal when the second counting information is selected from among the plurality of pieces of counting information stored in the storage unit 310 according to the number of user inputs.

Figure 7A:
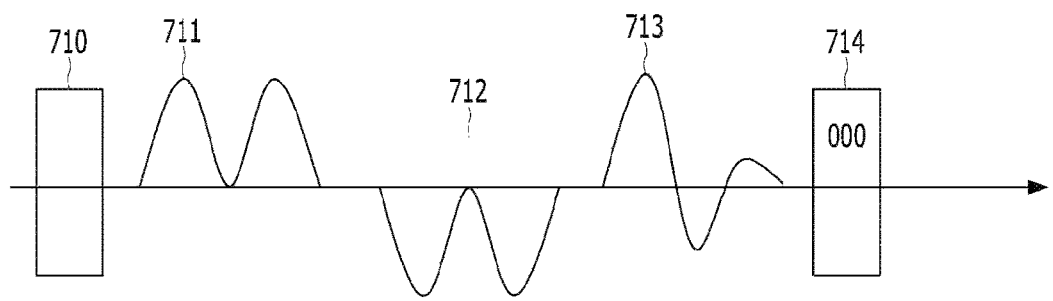
FIGS. 7a and 7b are diagrams illustrating authentication information converted into different types of sound wave signals depending on the counting information according to another embodiment of the present invention.
Figure 7B:
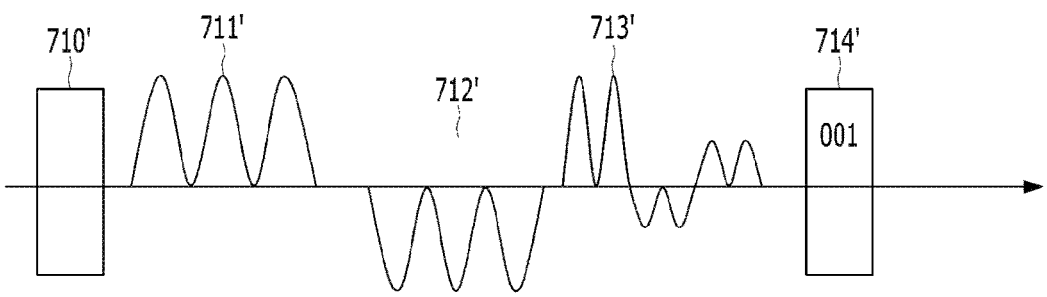

FIGS. 7a and 7b are diagrams illustrating authentication information converted into different types of sound wave signals depending on the counting information according to another embodiment of the present invention. Here, conversion performed by utilizing the mapping table illustrated in FIG. 4c as a conversion method will be described.

Referring to FIG. 7a, when the authentication information is "ABC" and the number of user inputs is 1, the control unit 330 performs a bit operation between each of "A", "B", and "C" constituting the authentication information and counting information "000" or preset data to generate a sound wave signal using an XOR operator corresponding to "000" when "000" is selected from among the plurality of pieces of counting information stored in the storage unit 310 in response to the number of user inputs being 1, and for the generated sound wave signal, a preamble signal 710, a sound wave signal 711 corresponding to A, a sound wave signal 712 corresponding to B, a sound wave signal 713 corresponding to C, and counting information 714 set to "000" are generated at predetermined time intervals.

Further, referring to FIG. 7b, when the user operates the authentication device 300 again and the number of user inputs becomes 2, the control unit 330 performs a bit operation between each of "A", "B", and "C" constituting the authentication information and counting information "001" or preset data to generate a sound wave signal using an OR operator corresponding to "001" when "001" is selected from among the plurality of pieces of counting information stored in the storage unit 310 in response to the number of user inputs being 2, and for the generated sound wave signal, a preamble signal 710', a sound wave signal 711' corresponding to A, a sound wave signal 712' corresponding to B, a sound wave signal 713' corresponding to C, and counting information 714' set to "000" are generated at predetermined time intervals.

Meanwhile, the control unit 330 reconstructs the authentication information on the basis of at least one of the first data arrangement order, the first frequency information, and the first counting information corresponding to the first counting information to perform conversion into a sound wave signal when the first counting information is selected from among the plurality of pieces of counting information stored in the storage unit 310 according to the number of user inputs.

Further, the control unit 330 reconstructs the authentication information on the basis of at least one of the second data arrangement order, the second frequency information, and the second counting information corresponding to the second counting information to perform conversion into a sound wave signal when the second counting information is selected from among the plurality of pieces of counting information stored in the storage unit 310 according to the number of user inputs.

Figures 8, 9A:
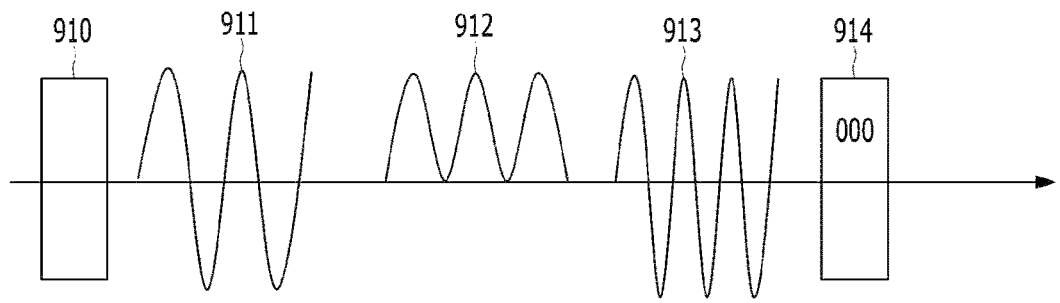
FIG. 8 is a diagram illustrating a conversion relationship between the counting information and characters or numbers according to another embodiment of the present invention.
FIGS. 9a and 9b are diagrams illustrating authentication information converted into different type of sound wave signals depending on the counting information according to another embodiment of the present invention.

FIG. 8 is a diagram illustrating a conversion relationship between the counting information and characters or numbers according to another embodiment of the present invention.

Referring to FIG. 8, when the authentication information is data consisting of "ABC" and the counting information is 000, the arrangement order of the data constituting the authentication information becomes "A", "B", and "C", a frequency component of "A" is set to 16000 Hz, operator information for encrypting "B" is set to NOR, and a frequency component of "C" is set to 16320 Hz.

Further, when the counting information is 001, the arrangement order of the data constituting the authentication information becomes "C", "A", and "B", a frequency component of "C" is 32000 Hz, operator information for encrypting "B" is set to XOR, and a frequency component of "C" is set to 32320 Hz.

As described above, since the conversion method according to the mapping table illustrated in FIG. 8 includes the conversion method of performing conversion by using at least one of the arrangement order of the data constituting the authentication information, the frequency information corresponding to each of the pieces of data constituting the authentication information, and the operator information for encrypting each of the pieces of data constituting the authentication information depending on the counting information, the arrangement order of the data constituting the authentication information is changed, the frequency information corresponding to each of the pieces of data constituting the authentication information is changed, or the operator information for encrypting each of the pieces of data constituting authentication information is changed depending on the counting information even for the same authentication information and the authentication information is transmitted as a sound wave signal, and thus, different sound wave signals are generated and security can be improved.

Further, since the server 400 stores the same mapping table illustrated in FIG. 4c, it is possible to confirm the original authentication information by utilizing the pre-stored mapping table even when differently converted sound wave signals are received for the same authentication information as described above.

Figure 9B:
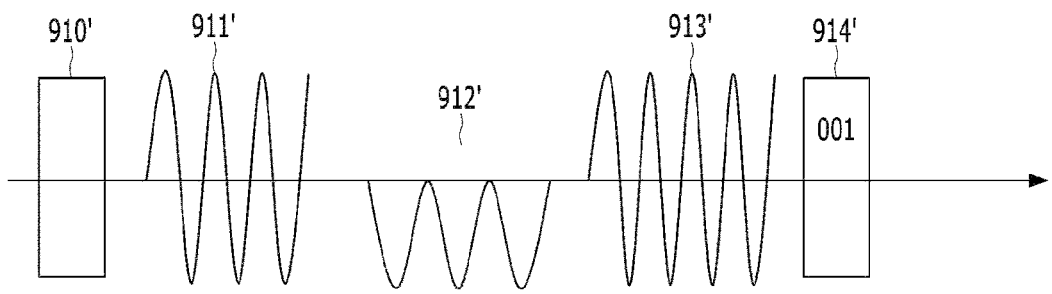

FIGS. 9a and 9b are diagrams illustrating authentication information converted into different type of sound wave signals depending on the counting information according to another embodiment of the present invention. Here, conversion performed by utilizing the mapping table illustrated in FIG. 8 as a conversion method will be described.

Referring to FIG. 9a, when the authentication information is "ABC" and the number of user inputs is 1, the control unit 330 causes a data arrangement order corresponding to "000" to be "ABC", causes A to have a frequency component at 16000 Hz, performs a bit operation on B using NOR operator information, and performs conversion so that C has a frequency component at 16320 Hz to generate a sound wave signal when "000" is selected from among the plurality of pieces of counting information stored in the storage unit 310 in response to the number of user inputs being 1, and for the generated sound wave signal, a preamble signal 910, a sound wave signal 911 corresponding to A, a sound wave signal 912 corresponding to B, a sound wave signal 913 corresponding to C, and counting information 914 set to "000" are generated at predetermined time intervals.

Meanwhile, referring to FIG. 9b, when the authentication information is "ABC" and the number of user inputs is 2, the control unit 330 causes a data arrangement order corresponding to "001" to be "CAB", causes C to have a frequency component at 32000 Hz, performs a bit operation on A using NOR operator information, and performs conversion so that B has a frequency component at 32320 Hz to generate a sound wave signal when "001" is selected from among the plurality of pieces of counting information stored in the storage unit 310 in response to the number of user inputs being 2, and for the generated sound wave signal, a preamble signal 910', a sound wave signal 911' corresponding to A, a sound wave signal 912' corresponding to B, a sound wave signal 913' corresponding to C, and counting information 914' set to "000" are generated at predetermined time intervals.

As described above, the control unit 330 may convert the authentication information by using the same conversion scheme for each piece of counting information, or may convert the authentication information by applying different conversion schemes to respective pieces of data constituting the authentication information.

Accordingly, the control unit 330 generates different sound wave signals on the basis of at least one of the first data arrangement order, the first frequency information, and the first counting information corresponding to the first counting information, for the same authentication information.

Further, the storage unit 310 may store at least one of a data arrangement order, frequency information, and operator information used for generation of the sound wave signal, and the server 400 may also store the same, making it possible to detect the same authentication information from the received sound wave signal.

Figure 10:
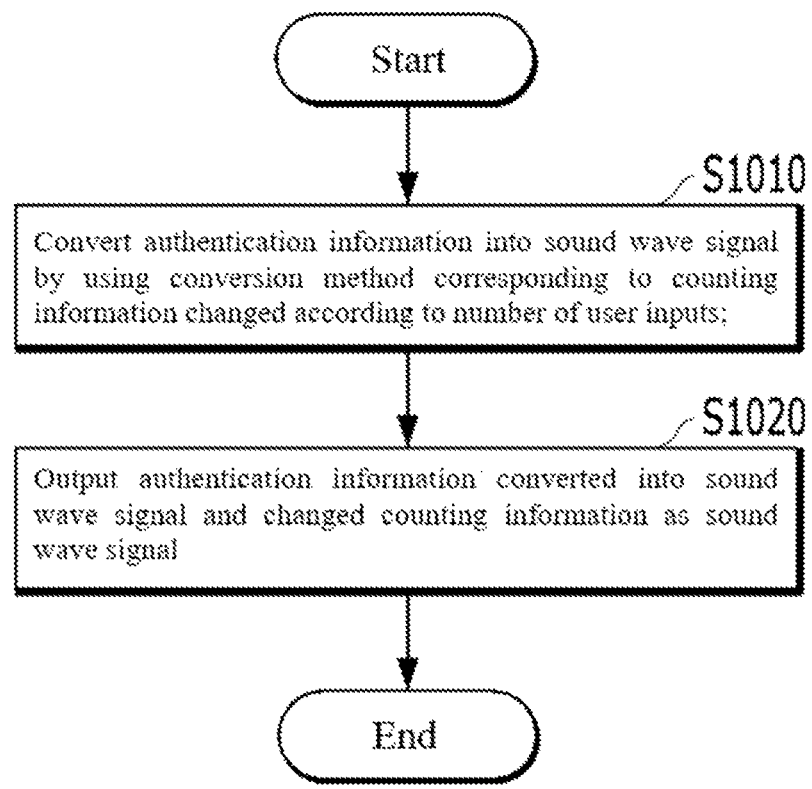
FIG. 10 is a flowchart illustrating a control method of the authentication device according to an embodiment of the present invention.

FIG. 10 is a flowchart illustrating a control method of the authentication device according to an embodiment of the present invention.

Referring to FIG. 10, a control method of an authentication device for storing a plurality of pieces of counting information corresponding to conversion methods of converting authentication information into a sound wave signal includes a step (S1010) of converting the authentication information into a sound wave signal by using the conversion method corresponding to the counting information changed according to the number of user inputs; and a step (S1020) of outputting the authentication information converted into the sound wave signal and the changed counting information as a sound wave signal.

Meanwhile, a non-transitory computer readable medium storing a program for sequentially performing the control method according to the present invention may be provided.

The non-transitory readable medium is not a medium that stores data for a short moment, such as a register, cache, or memory, but is a medium that stores data semi-permanently and can be read by a device. Specifically, the various applications or programs described above may be stored and provided in a non-transitory readable medium such as a CD, DVD, hard disk, Blu-ray disc, USB, memory card, or ROM.

Further, although a bus is not illustrated in the above-described block diagram illustrating the control unit for converting the authentication information into the sound wave signal by using the conversion method corresponding to the counting information changed according to the number of user inputs, communication between the respective components in the control unit may also be performed through a bus. Further, each device may further include a processor such as a CPU or a microprocessor that performs the various steps described above.

Further, although the preferred embodiments of the present invention have been illustrated and described above, the present invention is not limited to the specific embodiments described above, it is obvious that various modification can be made by those skilled in the art without departing from the gist of the present invention claimed in the claims, and the modifications should not be individually understood from the technical spirit or perspective of the present invention.

What is claimed is:

1. An authentication device comprising:
    a storage unit configured to store authentication information and a plurality of pieces of counting information corresponding to conversion methods of converting the authentication information into a sound wave signal;
    a control unit configured to change from one piece of counting information to another piece of counting information in response to each time a user input is received, according to the number of user inputs received, and convert the authentication information into the sound wave signal according to the conversion method corresponding to the changed counting information; and
    a sound wave output unit configured to output the sound wave signal corresponding to the authentication information and a sound wave signal corresponding to the changed counting information.

2. The authentication device according to claim 1, wherein the storage unit is configured to store, for each of the plurality of pieces of counting information, a mapping table regarding at least one of an order of arrangement of data constituting the authentication information, frequency information of a sound wave signal corresponding to the data constituting the authentication information, and operator information for encrypting the data constituting the authentication information.

3. The authentication device according to claim 2, wherein the control unit is configured to
    arrange data of the authentication information in a first data arrangement order corresponding to first counting information to perform conversion into the sound wave signal when the first counting information is selected from among the plurality of pieces of counting information stored in the storage unit according to a number of received user inputs, and
    arrange the data of the authentication information in a second data arrangement order corresponding to second counting information to perform conversion into another sound wave signal when the second counting information is selected from among the plurality of pieces of counting information stored in the storage unit according to the number of received user inputs.

4. The authentication device according to claim 2, wherein the control unit is configured to
    convert the authentication information into the sound wave signal on the basis of on first frequency information corresponding to first counting information when the first counting information is selected from among the plurality of pieces of counting information stored in the storage unit according to a number of received user inputs, and
    convert the authentication information into another sound wave signal on the basis of on second frequency information corresponding to second counting information when the second counting information is selected from among the plurality of pieces of counting information stored in the storage unit according to the number of received user inputs.

5. The authentication device according to claim 2, wherein the control unit is configured to
    encrypt the authentication information to perform conversion into the sound wave signal on the basis of first operator information corresponding to first counting information when the first counting information is selected from among the plurality of pieces of counting information stored in the storage unit according to a number of received user inputs, and
    encrypt the authentication information to perform conversion into another sound wave signal on the basis of second operator information corresponding to second counting information when the second counting information is selected from among the plurality of pieces of counting information stored in the storage unit according to the number of received user inputs.

6. The authentication device according to claim 2, wherein the control unit is configured to reconstruct the authentication information to perform conversion into the sound wave signal on the basis of at least one of first data arrangement order, first frequency information, and first operator information corresponding to first counting information when the first counting information is selected from among the plurality of pieces of counting information stored in the storage unit according to a number of received user inputs.

7. The authentication device according to claim 6, wherein the control unit is configured to reconstruct the authentication information to perform conversion into another sound wave signal on the basis of at least one of second data arrangement order, second frequency information, and second operator information corresponding to second counting information when the second counting information is selected from among the plurality of pieces of counting information stored in the storage unit according to the number of received user inputs.

8. The authentication device according to claim 6, wherein the control unit is configured to generate different sound wave signals on the basis of at least one of the first data arrangement order, the first frequency information, and the first operator information corresponding to the first counting information, for the same authentication information.

9. The authentication device according to claim 8, wherein the storage unit is configured to store at least one of a data arrangement order, frequency information, and operator information used for generation of the sound wave signal.

10. A control method of an authentication device for storing a plurality of pieces of counting information corresponding to corresponding to conversion methods of converting authentication information into a sound wave signal, the control method comprising:
  changing from one piece of counting information to another piece of counting information in response to each time a user input is received, according to the number of user inputs received;
  converting the authentication information into a sound wave signal according to the conversion method corresponding to the changed counting information; and
  outputting the sound wave signal corresponding to the authentication information and a sound wave signal corresponding to the changed counting information.

* * * * *